United States Patent
Chen et al.

(10) Patent No.: US 7,697,638 B2
(45) Date of Patent: Apr. 13, 2010

(54) MODULATION DETECTION IN A SAIC OPERATIONAL ENVIRONMENT

(75) Inventors: Weizhong Chen, Austin, TX (US); Paul L. Russell, Jr., Round Rock, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 909 days.

(21) Appl. No.: 11/205,450

(22) Filed: Aug. 16, 2005

(65) Prior Publication Data

US 2007/0041473 A1   Feb. 22, 2007

(51) Int. Cl.
*H04L 27/22* (2006.01)
(52) U.S. Cl. .................................. 375/329; 375/354
(58) Field of Classification Search ................ 375/329, 375/354, 355
See application file for complete search history.

(56) References Cited

U.S. PATENT DOCUMENTS

| | | | |
|---|---|---|---|
| 6,081,566 A | | 6/2000 | Molnar et al. |
| 6,463,107 B1 * | | 10/2002 | Lindoff et al. ............. 375/343 |
| 6,473,506 B1 * | | 10/2002 | Hook et al. ................ 379/279 |
| 6,724,809 B2 | | 4/2004 | Reznik |
| 7,133,476 B2 * | | 11/2006 | Arslan et al. .............. 375/346 |
| 2003/0035469 A1 | | 2/2003 | Frank et al. |
| 2004/0096012 A1 | | 5/2004 | Yang |
| 2004/0161065 A1 | | 8/2004 | Buckley et al. |
| 2005/0084045 A1 | | 4/2005 | Stewart et al. |

FOREIGN PATENT DOCUMENTS

FI   WO0152493   *   7/2001

OTHER PUBLICATIONS

Moisio, et al., The Effect of Single-Antenna Interference Cancellation on GPRS Performance, Nokia Research Center, Nokia Group, Finland.

* cited by examiner

*Primary Examiner*—Chieh M. Fan
*Assistant Examiner*—Freshteh Aghdam
(74) *Attorney, Agent, or Firm*—Dillon & Yudell LLP

(57) ABSTRACT

Blind modulation detection in a receiver of a wireless communication device calculates error energies for PSK and GMSK based on differences between a received training sequence signal and synthesized training signals generated from PSK and GMSK channel estimations and a known training sequence phase rotated by $3\pi/8$ and $\pi/2$ per symbol, respectively. A highly reliable modulation detection in a Single Antenna Interference Cancellation (SAIC) operational environment is achieved by a dual comparison of a total energy value of the received signal and the two error energies. PSK is determined if the PSK error energy value is found to be lower than both the GMSK error energy value and the total energy value by predetermined thresholds; otherwise the modulation type is determined to be GMSK.

25 Claims, 3 Drawing Sheets

MODULATION DETECTION IN A SAIC OPERATIONAL ENVIRONMENT

BACKGROUND OF THE INVENTION

1. Field of the Invention

The present invention relates in general to digital communication systems and in particular to mobile radio systems. Still more particularly, the invention relates to a method of reception and a receiver in a digital telecommunications system.

2. Description of the Related Art

Digital telecommunication systems typically employ one or more modulation schemes to communicate information such as voice, data, and/or control information. These modulation schemes may include GMSK (Gaussian Minimum Shift Keying), M-ary QAM (Quadrature Amplitude Modulation) or M-ary PSK (Phase Shift Keying), where $M=2^n$, with n being the number of bits encoded within a symbol period for a specified modulation scheme.

The EDGE (Enhanced Data rates for GSM Evolution) and the associated packet service EGPRS (Enhanced General Packet Radio Service) have been defined as a transitional standard between the GSM/GPRS (Global System for Mobile Communications/General Packet Radio Service) and UMTS (Universal Mobile Telecommunications System) mobile radio standards. Both GMSK modulation and 8-PSK modulation are used in the EDGE standard, and the modulation type can be changed from burst to burst. GMSK is a non-linear, Gaussian-pulse-shaped frequency modulation, and 8-PSK is a linear, 8-level phase modulation. However, the specific GMSK modulation used in GSM can be approximated with a linear modulation (i.e., 2-level phase modulation with a $\pi/2$ rotation). Similarly, the 8-PSK modulation in EDGE is an 8-level phase modulation with $3\pi/8$ rotation. The symbol pulse of the approximated GSMK and the symbol pulse of the 8PSK are identical.

In digital telecommunication systems employing multiple modulation schemes, if the modulation types to be used for information transmission between a transmitter and a receiver is not in a predetermined manner, the receiver must be either informed of the modulation type in advance via some measure or the receiver should be equipped with a capability to detect the modulation type from the received burst signal.

If the communication system is designed to inform the receiver of the modulation type used to send information for each and every burst before the transmission, the communication system will require extra bandwidth to convey the modulation type information to the receiver. In addition, this also introduces system latency, which is not permissible for real-time applications, such as in voice communication. Thus, a system for informing the receiver of the modulation type prior to message transmission is highly undesirable in practical applications.

Another technique is for the receiver to detect the modulation type of a particular burst of information in a digital communication system. Because the receiver relies on the transmission itself to detect the modulation type, this procedure is sometimes referred to as blind modulation detection. One blind modulation detection technique makes use of the training sequence included in every data burst. Common transmission standards define data bursts to include a fixed predetermined training sequence comprising a sequence of symbols, which are known to the receiver. The training sequence is intended to be used by the receiver to estimate the arrival time of the burst and the distortion and noise characteristics of the transmission channel. For example, upon receiving a training sequence, the receiver correlates the received training sequence signal to the known signal of the same training sequence. The receiver then utilizes this correlation to characterize the arrival time and channel (i.e., estimate the channel effects). In GSM wireless communication systems, for example, information is transmitted in transmission bursts, wherein each transmission burst may consist of two sections of data bits with a 26-bit midamble (training sequence) located in between. According to the GSM technical standards, one of eight possible training sequence codes can be used as the midamble.

The blind modulation detection technique using training sequence in a digital communication system derives a metric from the received training sequence signals for each possible modulation type. Each metric represents a likelihood that the corresponding modulation type is used by the transmitter to create the received signal. The metrics are analyzed based on certain decision logic to determine the modulation type of the received burst signal. As is known, GMSK and 8-PSK modulation in EDGE are distinguished by using different symbol rotations. All GMSK modulation rotates each transmission symbol by $\pi/2$ relative to its prior symbol in addition to the information phase, while the 8-PSK modulation rotates each transmission symbol in additional to the information phase by $3\pi/8$ relative to its prior symbol.

One method of deriving a metric passes the received signal into data path that rotates the signal back through a corresponding phase rotation for each symbol, called de-rotation. For example, in EDGE communication system where there are two possible modulation types, GMSK and 8-PSK modulation, the received training sequence is rotated in a first data path by $-n\pi/2$, where n is the symbol index in the sequence, and in the second data path by $-n3\pi/8$, respectively. After this, the de-rotated received training sequence is compared with a known training sequence stored in the receiver to generated two metrics, each with a different phase rotation assumption. The metric can be calculated by magnitude squared correlation of the de-rotated received training sequences with the known training sequence. Then the transmission modulation type is determined by the maximum of the two metrics.

In GSM communication systems, one way to increase system capacity is to increase the frequency reuse factor, whereby the communications system allocates the same frequency to multiple sites in closer proximity. However, when proximate cell sites transmit within the same frequency band, co-channel interference can occur, and when devices transmit in adjacent bands, adjacent-channel interference can occur if sufficient inter-band spacing is not provided. As a result, increased frequency reuse increases the co-channel interference and adjacent channel interference. Therefore, receivers operating in such an environment are required to have a better interference rejection performance.

Single Antenna Interference Cancellation (SAIC) is a general term used for advanced communications systems and receiver algorithms designed for the purpose of improving system capacity through increasing frequency reuse by enhancing single-antenna receiver performance in the presence of co-channel interference. SAIC is a promising technology currently being standardized in the industry that appears to be an attractive solution to the problems of frequency reuse, even though SAIC increases the complexity of the receiver. In the most advantageous interference conditions, SAIC can improve the signal-to-noise ratio over 10 dB. Current SAIC receiver algorithms are generally optimized for GMSK modulated signals, since gains of SAIC tend to be smaller for 8-PSK modulated signals. In an SAIC operational environment, GMSK traffic on neighboring cells can reuse common frequencies, thereby significantly increasing network bandwidth, while still tolerating the significantly higher co-channel and multi-channel interference than has been previously seen in conventional GMSK/EDGE environments.

While use of SAIC in wireless telecommunication systems overcomes the receiver performance issues introduced by frequency reuse, the high interference in a SAIC environment significantly impacts the reliability of traditional modulation detection techniques such as the prior art systems described above. Ideally, the receiver should be able to determine the modulation scheme associated with a particular burst of information regardless of the operating environment. However, the increased co-channel and adjacent channel interference created by SAIC operating environments does not permit conventional modulation detection techniques to reliably detect the modulation type of a transmission burst, thereby degrading radio telephone performance and quality. Further compounding the problem is the fact that front-end modulation detection must be capable of attaining the same or greater signal gain as attained by the SAIC receiver in order to fully achieve the large gain advantages from SAIC receiver. Unfortunately, prior art modulation detection methodologies fail to achieve the necessary gain because of the higher co-channel interference in SAIC environments. Therefore, what is needed is a new modulation detection technique that reliably performs and achieves high gain in the SAIC operational environment to achieve full performance of the receiver implementing SAIC.

BRIEF DESCRIPTION OF THE DRAWINGS

This invention is described in a preferred embodiment in the following description with reference to the drawings, in which like numbers represent the same or similar elements, as follows.

DETAILED DESCRIPTION OF PREFERRED EMBODIMENTS

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims. In particular, although the preferred embodiment is described below with respect to a wireless mobile communication device, it will be appreciated that the present invention is not so limited and that it has application to other embodiments of electronic devices such as portable digital assistants, digital cameras, portable storage devices, audio players and portable gaming devices, for example.

Figure 1:
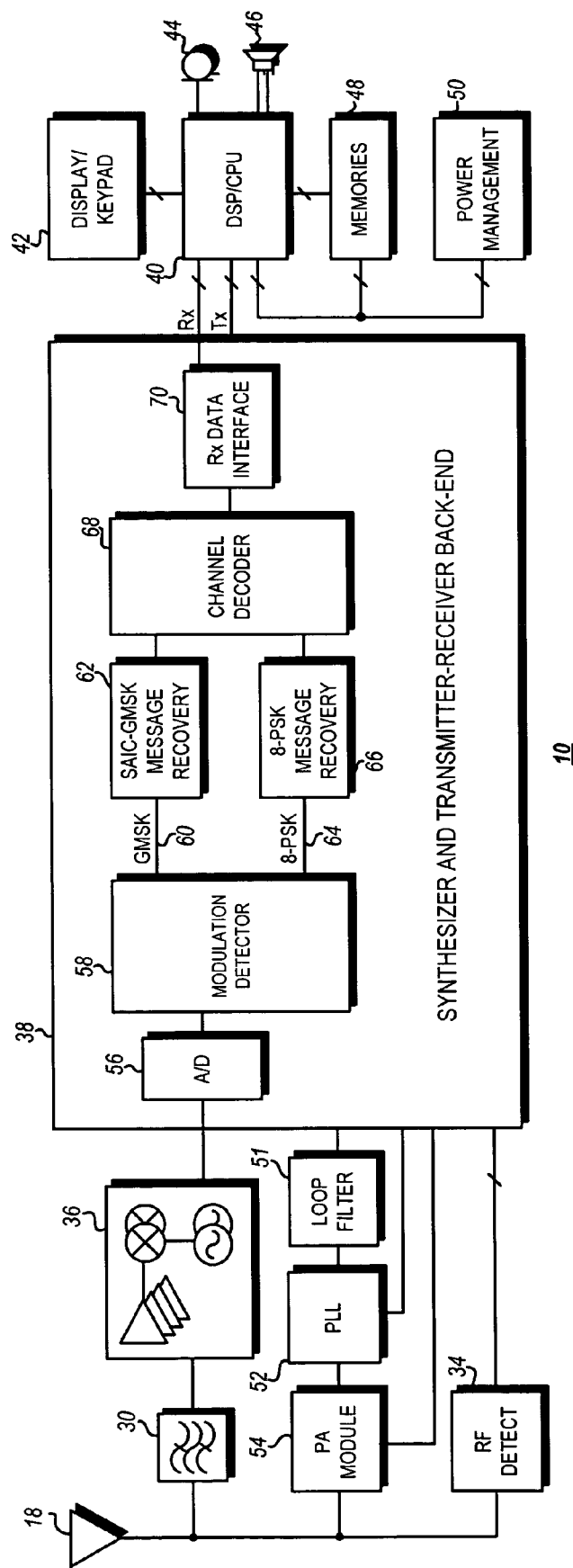
FIG. 1 shows a block diagram of a wireless mobile communication device, in accordance with a preferred embodiment of the present invention.

With reference now to the Figures, and in particular in reference to FIG. 1, there is shown a block diagram of a wireless mobile communication device, in accordance with a preferred embodiment of the present invention. In this embodiment, the wireless mobile communication device 10 may be, for example, a cellular handset, a wireless-enabled laptop computer, a one or two-way pager, or some other wireless communication device.

Wireless mobile communication device 10 generally comprises antenna 18 coupled to a filter 30, a power amplifier (PA) 54, and a radio frequency (RF) detector 34. Filter 30 is coupled to receiver (Rx) front-end block 36, which contains standard receiver components such as gain stages, mixers, oscillators, etc., as generally depicted, and mixes the received RF transmission down to base band. Rx front-end block 36 has an output coupled to a synthesizer and transmitter/receiver (Tx/Rx) back-end block 38, which in turn is coupled to a digital signal processor/central processing unit (DSP/CPU) 40 over transmit (Tx) and receive (Rx) connections, or alternatively a communications bus (not shown). The synthesizer and Tx/Rx block 38 is also coupled through loop filter 51 to a phase lock loop (PLL) 52 that generates RF transmission signals for amplification by power amplifier (PA) module 54 and transmission over antenna 18. The receiver front-end block 36 and synthesizer and transmitter/receiver back-end block 38 are preferably integrated circuits (ICs), although other embodiments may be implemented.

DSP/CPU 40 has memories 48 associated therewith, for example read-only memory (ROM) and read/write random access memory (RAM). Various input and output devices are coupled to the CPU, including a display and keypad referenced with a common identifier 42, a microphone 44 and speaker 46. The exemplary embodiment also includes a power management module 50.

Tx/Rx back-end block 38 is shown containing the block components of a message recovery path coupling Rx front-end block 36 to a receive (Rx) input of DSP/CPU 40. As will be appreciated by those skilled in the art, Tx/Rx back-end block 38 is comprised of additional components that are not shown in FIG. 1 to simplify the following description of a preferred embodiment. Analog-to-digital (A/D) converter 56 is coupled to Rx front-end block 36 to digitally convert the received transmission signals into data packets. Modulation detector 58 is coupled to A/D converter 56 to receive the digital transmission data from A/D converter 56, and detect the modulation type of a received packet.

In a preferred embodiment, wireless communication device 10 is configured for EDGE operation in either a GMSK or 8-PSK modulation mode. If modulation detector 58 detects GMSK modulation in the received signal, the EDGE burst is output on connection 60 to be received by a SAIC-GMSK message recovery block 62, where SAIC algorithms perform message recovery of the GMSK modulated signals in a manner known in the art. Similarly, if 8-PSK modulation is detected by modulation detector 58, the EDGE burst is output on connection 64 to be received by 8-PSK message recovery block 66, where message recovery is performed on the 8-PSK modulated signals in a manner known in the art. Each of the message recovery blocks 62, 66 rotates the received packet by the phase rotation factor for the particular modulation being detected in the data path, in this case, each of the two modulation types, GMSK and PSK. In the embodiment shown in FIG. 1, SAIC-GMSK message recovery block 62 performs a rotation of $\pi/2$ on the received symbols. Similarly, 8-PSK message recovery block 66 performs a rotation of $3\pi/8$ on the received symbols. Accordingly, each of the message recovery blocks 62, 66 generate a recovered message at their outputs, respectively.

Channel decoder 68 is coupled to SAIC-GMSK and 8-PSK message recovery blocks 62, 66 to receive recovered message packets and perform channel decoding thereon. Channel decoder 68 is coupled to receive data interface 70, which buffers and transfers decoded packets to DSP-CPU 40 for application processing. As will be appreciated, the functions performed by blocks 56, 58, 62, 66, 68 and 70 may be implemented in either hardware or software, or a combination thereof.

Figure 2:
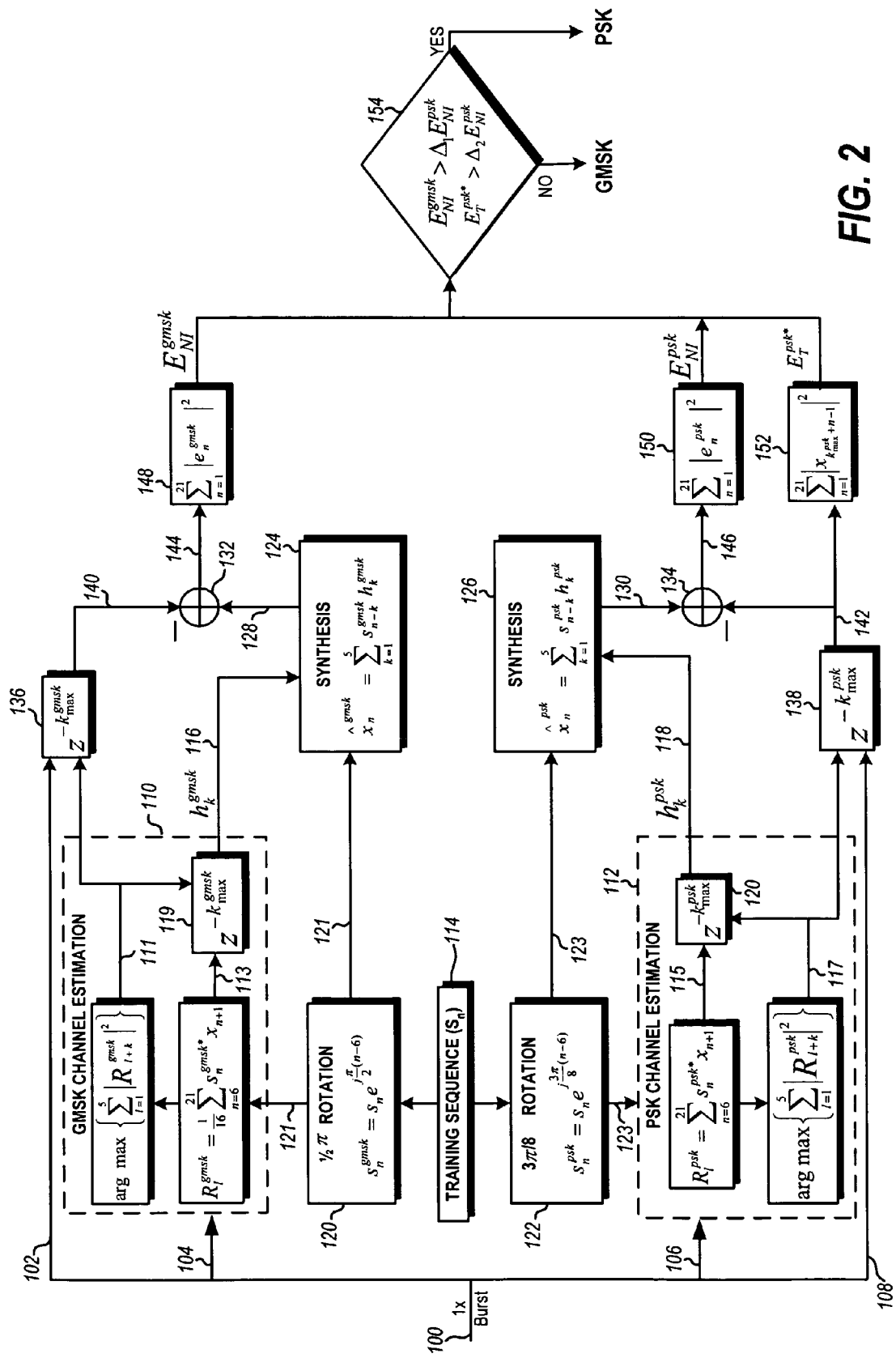
FIG. 2 shows a flow diagram of a method for blind modulation detection in a receiver of a wireless communication device, in accordance with a preferred embodiment of the present invention.

With reference now to FIG. 2, there is shown a flow diagram of a method for blind modulation detection in a receiver of a wireless communication device, in accordance with a preferred embodiment of the present invention. The midamble training sequence 100 of a received EDGE burst is sampled at one sample per symbol. The received training symbol signals, ($x_n$), are duplicated to produce four samples of the received training symbols that are fed into four data paths 102, 104, 106, and 108. The received training signals, ($x_n$), on connection 104 are forwarded to GMSK channel estimation block 110, and the received training signals on connection 106 are forwarded to PSK channel estimation block 112. Each of the channel estimation blocks 110, 112 performs a correlation between the received training signals, ($x_n$), and a known training sequence rotated by the phase rotation factor for the particular modulation being detected in the data path, in this case, each of the two modulation types, GMSK and 8-PSK.

The training sequence 114 is an original training sequence held in the receiver and known to be the training sequence used by the transmitter for a given transmission. Training sequence 114 is denoted by ($s_n$) (n=1, 2 . . . N, where N denotes the length of the training sequence). For example, N=26 in a standard EDGE embodiment.

The GMSK rotated training sequence is generated by rotation module 120 through a rotation of $\pi/2$ to each symbol of training sequence 114 as follows:

$$s_n^{gmsk} = s_n e^{j\frac{1}{2}\pi(n-6)}$$

Similarly, the PSK rotated training signal is generated by rotation module 122 through a rotation of $3\pi/8$ per symbol on the training sequence 114 as follows:

$$s_n^{psk} = s_n e^{j\frac{3}{8}\pi(n-6)}$$

Accordingly, each rotation module 120, 122 generates a set of rotated training samples for the associated modulation type at its output 121, 123, respectively.

A correlation between the received training signals 104, 106 and the rotated training samples 121, 123 is then performed by channel estimation modules 110, 112, respectively.

The received GMSK training signals ($x_n^{gmsk}$), having N symbol periods, where N is 5 in a preferred embodiment, can be represented as:

$$x_n^{gmsk} = \sum_{k=1}^{5} s_{n-k}^{gmsk} h_k = s_n^{gmsk} * h_n$$

Where $h_k$ is the composite channel impulse response, and k=0, 1 . . . 4. This composite response includes the transmitter filter, over-the-air channel effects, receiver filter, Analog/Digital conversion, etc. Similarly, the received PSK training signals ($x_n^{psk}$) can be represented as:

$$x_n^{psk} = \sum_{k} s_{n-k}^{psk} h_k = s_n^{psk} * h_n$$

Therefore, a channel estimation for each of PSK and GMSK training sequences may then be estimated by:

$$\begin{cases} \hat{h}_n = x_n^{psk} \otimes s_{-n}^{*psk} \\ \hat{h}_n = x_n^{gmsk} \otimes s_{-n}^{*gmsk} \end{cases}$$

Where $\otimes$ represents a convolution operation and * represents a complex conjugate operation.

Accordingly, GMSK channel estimation module 110 produces a correlation vector, R (output as signal 113), of 13 symbol periods. R is a correlation between the received training sample signals ($x_n$) on data path 104 and the complex conjugate of the GMSK rotated training samples ($s_n^{gmsk*}$) as follows:

$$R_l^{gmsk} = \frac{1}{16} \sum_{n=6}^{21} s_n^{gmsk*} x_{n+l}$$

Similarly, a correlation between the received training samples ($x_n$) on data path 106 and the PSK rotated training samples ($s_n^{psk}$) by the PSK channel estimation module 112 produces a correlation vector, R (output as signal 115) of 13 symbol periods, as follows:

$$R_l^{psk} = \frac{1}{16} \sum_{n=6}^{21} s_n^{*psk} x_{n+l}$$

Each channel estimation module 110, 112 then calculates a five-point moving average of the magnitude squared of the correlation vector for GMSK and PSK, respectively, as follows:

$$\begin{cases} E_h^{gmsk}(l) = \sum_{n=1}^{5} |R_{n+l-1}^{gmsk}|^2, \quad l = 1, 2, \ldots, 9 \\ E_h^{psk}(l) = \sum_{n=1}^{5} |R_{n+l-1}^{psk}|^2, \quad l = 1, 2, \ldots, 9 \end{cases}$$

These moving averages of the correlations allows the detection of the arrival time of the training sequence in the received burst. Channel estimation module 110 selects the index of the maximum of the 5-point moving average for the GMSK modulation to be output as signal 111, as follows:

$$\operatorname{argmax}\left\{\sum_{l=1}^{5}|R_{l+k}^{gmsk}|^2\right\}$$

Signal 111 represents a timing of the training sequence in the received signal, which can be used to derive the starting point of the training sequence in the received signal.

Channel estimation module 112 selects the index of the maximum of the 5-point moving average for the PSK modulation to be output as signal 117, as follows:

$$\operatorname{argmax}\left\{\sum_{l=1}^{5}|R_{l+k}^{psk}|^2\right\}$$

Then, module 119 identifies the 5 points of the correlation 113 corresponding to the maximum index, based on timing signal 111, as the estimated channel 116 ($h_k^{gmsk}$). Similarly, module 136 identifies the 21 points of the training sequence of the received EDGE signal 102 under the assumed GMSK modulation with the correct timing based on timing signal 111. This results in the correctly timed GMSK received training sequence on output 140.

Correspondingly, module 120 identifies the 5 points of the correlation 115 corresponding to the maximum index, based on timing signal 117, as the estimated channel 118 ($h_k^{psk}$). Module 138 identifies the 21 points of the training sequence of the received EDGE signal 108 under the assumed PSK modulation with the correct timing based on timing signal 117. This results in the correctly timed PSK received training sequence on output 142.

As seen in FIG. 2, the GMSK estimated channel 116 ($h_k^{gmsk}$) is passed to synthesis module 124 to synthesize a theoretical model of training sequence signal in GMSK ($x_n^{gmsk}$), while PSK channel estimation signal 118 ($h_k^{psk}$) is passed to synthesis module 126 to synthesize a theoretical model of the training sequence signal in PSK ($x_n^{psk}$). In other words, each synthesis module 124, 126, synthesizes the received channel estimation 116, 118 with the rotated training sequence 121, 123 to create a training sequence sample that has been rotated for the selected modulation type and simulated with the channel characteristics.

As previously explained, where ($h_n$) is the composite channel, the estimated GMSK training signals ($\hat{x}_n^{gmsk}$) on output 128 can be represented as:

$$\hat{x}_n^{gmsk} = \sum_{k=1}^{5} s_{n-k}^{gmsk} h_k^{gmsk}$$

Similarly, the estimated PSK training signals ($\hat{x}_n^{psk}$) on output 130 can be represented as:

$$\hat{x}_n^{psk} = \sum_{k}^{5} s_{n-k}^{psk} h_k^{psk}$$

The timed GMSK and PSK training sequence signals 140, 142 from modules 136, 138, respectively, are subtracted from the synthesized signals 128, 130 by combiners 132, 134, respectively, to generate error signals 144, 146, respectively. Each error signal 144, 146 indicates the difference between the received training sequence and the estimated training sequence for each type of modulation.

A sum-squared calculation is applied to the GMSK error signal 144 by module 148 to calculate a total energy of the error signal as follows:

$$\sum_{n=1}^{21}|e_n^{gmsk}|^2$$

This generates an error energy ($E_{NI}^{gmsk}$) with the assumption of GMSK modulation. The error energy calculated will be a function of the total noise plus co-channel interference detected in the GMSK channel. As will be appreciated, this error energy will be lower for cases where GMSK signal is transmitted, thereby suggesting the received modulation type is GMSK. If the transmitted signal is PSK, the GMSK error energy will be higher.

In a similar manner, module 150 generates the error energy with the assumption of PSK modulation. The calculated error energy ($E_{NI}^{psk}$) will be a function of the total noise plus co-channel interference detected in the PSK channel. This calculation of PSK error energy, across 21 symbol periods and timed to the PSK timing signal 117, is defined as:

$$\sum_{n=1}^{21}|e_n^{psk}|^2$$

As will be appreciated, this PSK error energy will be lower for cases where PSK signal is transmitted, thereby suggesting the received modulation type is PSK. If the transmitted signal is GMSK, the PSK error energy will be higher.

In accordance with the preferred embodiment, module 152 calculates the total energy ($E_T^{psk}$) generated by the PSK time-corrected training sequence signal. The received training sequence signal on data path 108 has its total energy calculated by a sum-squared calculation, across 21 symbol periods, and in one embodiment timed to the PSK timing signal 117, as:

$$\sum_{n=1}^{21}|x_{k_{max}^{psk}+n-1}^{psk}|^2$$

In an alternative embodiment, the total energy is calculated by a sum-squared calculation, across 21 symbol periods, using the nominal timing directly from data path 108.

The resulting calculated energy values, $E_{NI}^{gmsk}$, $E_{NI}^{psk}$ and $E_T^{psk}$ are generated from modules 148, 150,152 and then compared at module 154 to detect the modulation type of the received transmission burst in accordance with the invention. Module 154 performs two comparisons to detect the transmission modulation type, in one embodiment, although more comparisons can be made to increase the reliability of the detection methodology in other embodiments. The first comparison is between the GMSK error energy ($E_{NI}^{gmsk}$) and the PSK error energy ($E_{NI}^{psk}$) multiplied by a constant ($\Delta_1$). The constant $\Delta_1$ is included in the comparison to compensate for the inherently lower interference noise in PSK operation environment. The second comparison at module 154 is between the PSK total energy ($E_T^{psk}$) and the PSK error energy ($E_{NI}^{psk}$) multiplied by a constant ($\Delta_2$). The second comparison reflects the fact that PSK modulation has a higher data rate and does not work in SAIC environment according to the current specification. Thus, PSK modulation operates in an environment with higher C/I (the ratio of desired signal to noise plus interference) than GMSK modulation. The second comparison in the detection logic 154 is included to significantly improve the reliability of the modulation detection process beyond that which would be achieved using a single comparison.

Therefore, in accordance with the preferred embodiment, a decision as to the modulation type using the blind modulation detection of a preferred embodiment first identifies if the GMSK noise-interference energy ($E_{NI}^{gmsk}$) is greater than a PSK noise-interference energy multiplied by a threshold ($\Delta_1 E_{NI}^{psk}$). Second, it is determined if the total energy of the received PSK training sequence is greater than the PSK noise-interference energy multiplied by a threshold ($\Delta_2 E_{NI}^{psk}$). Only if both conditions are satisfied is it determined that the received packet is of a PSK modulation type. If either condition is not met, it is determined that the received packet is of a GMSK modulation type. By using the dual comparison and determination at module 154, a much more reliable blind modulation detection methodology can be achieved. Analysis has shown an optimized modulation detection under conditions where module 154 uses $\Delta_1=1.625$ and $\Delta_2=2.625$.

As will be appreciated, an alternative preferred embodiment of the present invention would first identify if the GMSK noise-interference energy (L.sub.NI.sup.gmsk) is less than a PSK noise-interference energy multiplied by a threshold (.DLLTA.sub.1L.sub.NI.sup.psk). Second, it would be determined if the total energy of the received PSK training sequence signal is less than the PSK noise-interference energy multiplied by a threshold (.DELTA..sub.2L.sub.NI.sup.psk). If either condition is satisfied, it is determined that the received packet is of a GMSK modulation type. If neither of the conditions is met, it is determined that the received packet is of a PSK modulation type. In still another preferred embodiment, the total energy of the received signal 140 assuming GMSK modulation is calculated (in place of module 152) and used in the detection logic of module 154 in the place of L.sub.T.sup.psk. Moreover, the present invention is not restricted to using the training sequence, which is normally included in a data burst, in the described manner. In principle, it is also possible to use any other sequence of information data that is transmitted during the communication process to detect the burst modulation type, in accordance with the invention.

Figure 3:
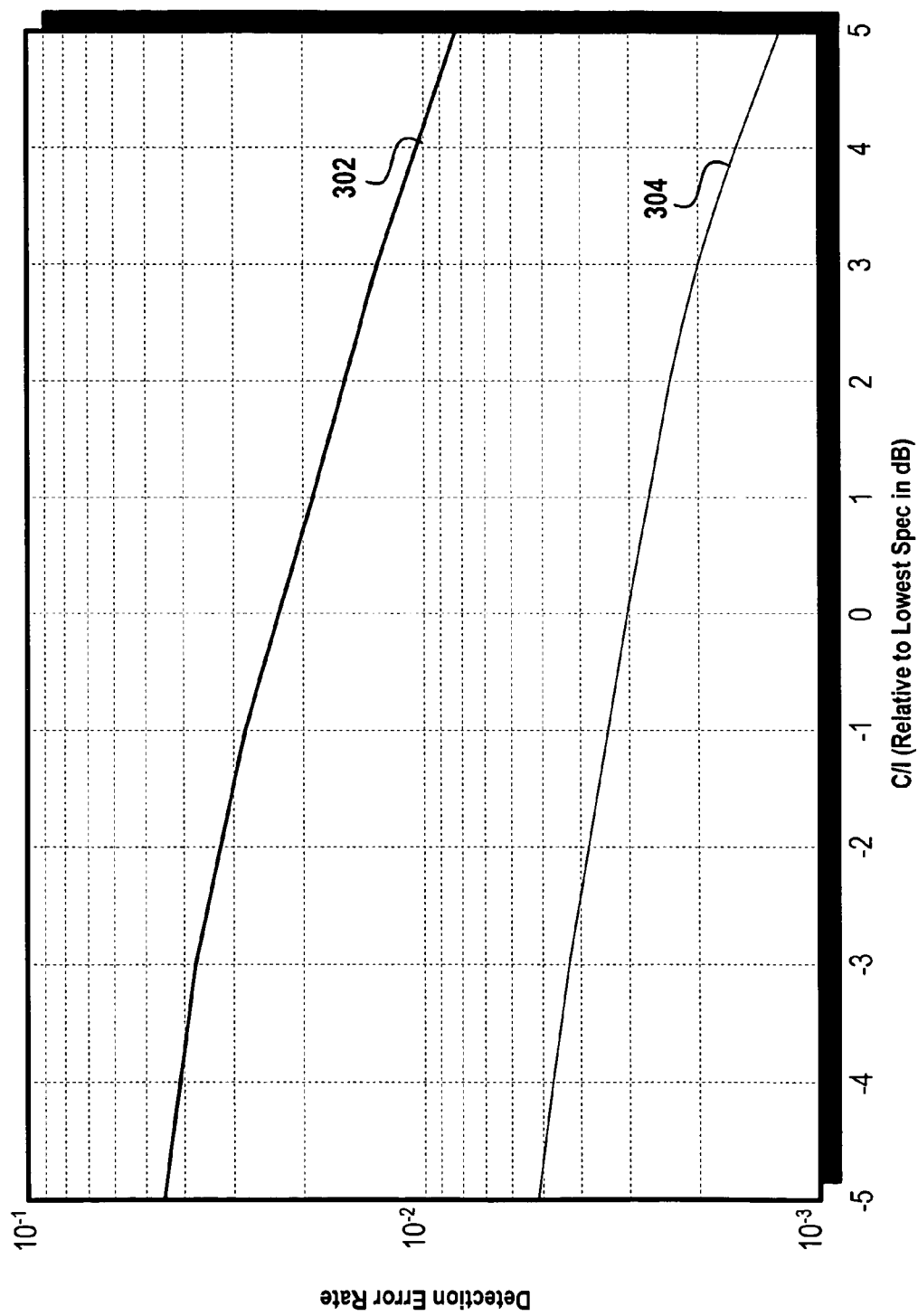
FIG. 3 shows a data plot illustrating the dramatically increased detection reliability in low C/I or SAIC environments achieved by a preferred embodiment of the present invention.

FIG. 3 shows a data plot illustrating the dramatically increased detection reliability in low C/I or SAIC environments, according to a preferred embodiment of the present invention. A first curve 302 displays the performance of a conventional modulation detector and a second curve 304 displays the performance of the blind modulation detection methodology of the present invention as disclosed in the preferred embodiment shown in FIG. 2. These performance results show that the detection error rate remains significantly lower using the modulation detection of the preferred embodiment (plot 304) than a conventional modulation detector (plot 302) across a typical range of C/I in SAIC environments. Note that the modulation detection error rate for plot 304 remains well below one percent (1%) at C/I as low as minus 5 dB. It will be appreciated that the modulation detection of the present invention provides a more than 10 dB gain advantage over the prior art and is sufficient for SAIC operation. In contrast, conventional modulation detection is not sufficient for SAIC because it exceeds the 1% error rate at 4 dB above the specification.

The superior performance achieved by the preferred embodiments results from the recognition that in a SAIC operational environment for GMSK, which increases frequency reuse, the noise-interference energy level will be higher for GMSK than PSK. Therefore, a single comparison of the error energies between the modulation types such as that seen in the prior art may not be sufficient for accurately and reliably making a modulation detection as a result of the added noise-interference in the GMSK channel. Adding an additional comparison of the PSK error energy level to the total energy level of the received signal increases the probability that a PSK transmission can be more accurately detected.

As will be appreciated, the processes in preferred embodiments of the present invention may be implemented using any combination of computer programming software, firmware or hardware. As a preparatory step to practicing the invention in software, the computer programming code (whether software or firmware) according to a preferred embodiment will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc., or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention.

While the invention has been particularly shown and described with reference to preferred embodiments, it will be understood by those skilled in the art that various changes in form and detail may be made therein without departing from the spirit and scope of the invention. Any variations, modifications, additions, and improvements to the embodiments described are possible and may fall within the scope of the invention as detailed within the following claims.

What is claimed is:

1. In a digital telecommunication system, a method for identifying signaling information transmitted from a transmitter to a receiver, said method comprising the steps of:
    calculating a first error energy value for a first modulation type based on a difference between a received signal and a first synthesized training signal;
    calculating a second error energy value for a second modulation type based on a difference between a received signal and a second synthesized training signal;
    calculating a total energy value for the received signal based on the received signal; and
    comparing the first error energy value with the second error energy value and the total energy value to determine the modulation type of the received signal.

2. The method according to claim 1, wherein the received signal contains a sequence of data symbols transmitted from the transmitter, and wherein each data symbol has been rotated through a phase rotation factor corresponding to either the first or second modulation type.

3. The method according to claim 2, wherein the data symbols include training symbols corresponding to a known training sequence.

4. The method according to claim 1, further comprising the steps of:
rotating a known training sequence through a first phase rotation factor to generate a first rotated training sequence and through a second phase rotation factor to generate a second rotated training sequence;
forming a first channel estimation based on the first rotated training sequence and the received signal; and
forming a second channel estimation based on the second rotated training sequence and the received signal.

5. The method according to claim 4, further comprising the steps of:
forming the first synthesized training signal based on the first estimated channel and the first rotated training sequence;
forming the second synthesized training signal based on the second estimated channel and the second rotated training sequence;
comparing the first synthesized training signal to the received signal to produce the first error energy value;
comparing the second synthesized training signal to the received signal to produce the second error energy value; and
forming the total energy value based on the received signal.

6. The method according to claim 5, wherein the first synthesized training signal is formed by a convolution of the first rotated training sequence and the first estimated channel.

7. The method according to claim 4, wherein the received signal contains a sequence of data symbols transmitted from the transmitter, wherein each data symbol has been rotated through a phase rotation factor corresponding to a modulation type, the method further comprising the steps of:
forming a first temporal position function identifying the beginning of the sequence of data symbols based on the first estimated channel; and
forming a second temporal position function identifying the beginning of the sequence of data symbols based on the second estimated channel.

8. The method according to claim 7, wherein the first temporal position function is calculated based on a maximum value of the moving average of the correlation between the first rotated training sequence and the received signal.

9. The method according to claim 7, wherein the first estimated channel is formed as a function of the first temporal position function.

10. The method according to claim 1, further comprising the steps of forming a first subtraction between the received signal and the first synthesized training signal, and squaring a magnitude of the first subtraction to form the first error energy value.

11. The method according to claim 1, further comprising the steps of forming a summation of the magnitude squared of the received signal to form the total energy value.

12. The method according to claim 1, wherein the step of comparing further comprises comparing the second error energy value with a first error energy threshold value, wherein the first energy threshold value comprises the first energy value multiplied by a first constant, wherein the first constant is greater than 1, and further comparing the total energy value with a second error energy threshold, wherein the second error energy threshold comprises the first error energy value multiplied by a second constant.

13. The method according to claim 1, wherein a modulation type having lower co-channel interference is determined when the second error energy value is greater than the first error energy value and the total energy value is greater than the first error energy value.

14. The method according to claim 13, wherein the lower co-channel interference modulation type is Phase Shift Keying (PSK).

15. The method according to claim 13, wherein when a modulation type having a lower co-channel interference modulation type is not determined, the modulation type is determined to be Gaussian Minimum Shift Keying (GMSK).

16. The method according to claim 1, wherein the determined modulation type involves 8-Phase Shift Keying.

17. The method according to claim 1, wherein the determined modulation scheme involves Gaussian Minimum Shift Keying.

18. An article of manufacture comprising a machine-readable medium including program logic embedded therein for causing circuitry to perform the steps of claim 1.

19. In a digital telecommunication system, a method for identifying signaling information transmitted from a transmitter to a receiver, said method comprising the steps of:
receiving a signal containing a sequence of data symbols transmitted from the transmitter, wherein the data symbols include training symbols corresponding to a known training sequence, and wherein each data symbol has been rotated through a phase rotation factor;
rotating the known training sequence through a first phase rotation factor to generate a first rotated training sequence and through a second phase rotation factor to generate a second rotated training sequence;
forming a first estimated channel based on the first rotated training sequence and the received signal;
forming a second estimated channel based on the second rotated training sequence and the received signal;
forming a first synthesized training signal based on the first estimated channel and the first rotated training sequence;
forming a second synthesized training signal based on the second estimated channel and the second rotated training sequence;
comparing the first synthesized training signal to the received signal to produce a first error energy value;
comparing the second synthesized training signal to the received signal to produce a second error energy value;
forming a total energy value based on the received signal; and comparing the first error energy value to the second error energy value, and
comparing the second error energy value with the total energy value, and determining therefrom a modulation type used by the transmitter to generate the received signal.

20. A receiver in a digital telecommunication system, comprising: a modulation detection module for receiving a signal containing a sequence of symbols transmitted from a transmitter and determining a modulation type of the signal; a plurality of message recovery modules coupled to the modulation detection module, each receiving data symbols encoded using a different modulation type; a channel decoding module coupled to the plurality of message recovery modules for receiving recovered messages and decoding the symbols therein based on the determined modulation type; and wherein the modulation detection module is configured to perform a method according to claim 1.

21. The receiver according to claim 20, wherein at least one of the plurality of message recovery modules performs message recovery including single antennae interference cancellation (SAIC) techniques.

22. The receiver according to claim 20, wherein the receiver is used in a communication system that is Global System for Mobile Telephony (GSM) compliant.

23. The receiver according to claim 20, wherein the sequence of data symbols is a training sequence of a data burst.

24. The receiver according to claim 20, wherein the modulation type is Phase Shift Keying PSK.

25. The receiver according to claim 20, wherein the modulation type is Gaussian Minimum Shift Keying (GMSK).

* * * * *